CIRCUIT APPARATUS AND METHOD

Filed Dec. 30, 1955

Inventors
Keith A. Backus
William P. Somers
by Morton D. Moore
Their Attorney

United States Patent Office 2,912,481

Patented Nov. 10, 1959

2,912,481

CIRCUIT APPARATUS AND METHOD

Keith A. Backus, Cohoes, and William P. Somers, Schenectady, N.Y., assignors to General Electric Company, a corporation of New York Application December 30, 1955, Serial No. 556,673

2 Claims. (Cl. 174—138)

This invention relates generally to circuit apparatus and technique and, more particularly, to coil forms which are especially adaptable to use with printed circuits and methods of securing such coil forms thereto.

A substantial portion of the cost of making and applying coils to circuits, and particularly to printed circuits, has been the cost of the labor involved in attaching the coil leads and taps to the circuit and mechanically securing the coil, or coils, to the circuit board or chassis. A common method of physically securing coil forms to a circuit board or chassis has been to attach it by means of screws, rivets, or other such devices, and a common means of electrically connecting each lead or tap on the coil to the circuit conductors has been to separately solder each lead thereto or to solder each lead to a terminal lug and in turn solder or otherwise connect the terminal lug to a circuit conductor. Where a printed circuit board having a conducting surface on one side is used, each coil lead must be brought through the circuit board and soldered to the conductors on the reverse side thereof. In addition, where a laminar magnetic core is to be utilized with the coil, fabrication of the coil is complicated by the fact that the laminations are generally secured together and to the coil forms by means of bolts, rivets, or possibly special metallic bindings.

Accordingly, it is an object of this invention to provide a simple low cost coil form wherein the necessity of providing lug terminals for wiring connections is eliminated.

Another object of this invention is to provide such a coil form wherein the coil form may be held to a printed circuit board or chassis without the provision of special holding means.

A further object of this invention is to provide a coil form of the character described which may be used to secure an iron core in the coil form and to secure both the coil and the core to a chassis or printed circuit board without separate core holding means and a method for performing these functions.

Another object of this invention is to provide a coil form wherein separate terminal lugs need not be provided for connecting the coil leads to a circuit, which may be readily applied to and held in a printed circuit board or a chassis, and which may be utilized to hold a magnetic core within the coil form without special securing apparatus.

A still further object of this invention is to provide a method for performing the individual functions set forth in the previous objects utilizing the coil form of this invention.

Briefly stated in accordance with this invention, the necessity for providing terminal lugs for bringing leads out from a coil is eliminated by the provision of a coil form consisting of a spool body of electrical insulating material having flanges on either end, which flanges are made of a printed circuit material. In this manner, any desired number of circuit terminals may be provided on the end flanges of the coil form by simply etching out areas between terminal sections on the printed circuit material. The manner in which the coil form is attached to a chassis or printed circuit board without the use of special connecting apparatus such as bolts or rivets, and the manner in which the coil form may be used to hold a magnetic core within the coil form itself is described in detail in the following description.

In practicing this invention in its broader aspects, it will occur to those skilled in the art that the coil form itself may have various configurations, and that the principles about to be disclosed are equally applicable to all such variations.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which Fig. 1 is a perspective view of a coil form embodying the present invention;

Figure 1:
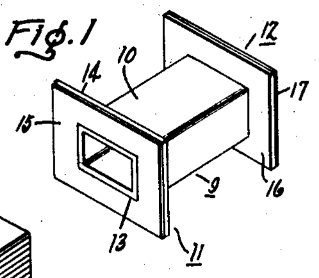

Referring now to Fig. 1 of the drawings, a simple coil form 9 embodying the invention is shown as comprising a spool body 10 made of an electrical insulating material and end flanges 11 and 12 attached to the spool body. The end flanges 11 and 12 are preferably made of a printed circuit material. As illustrated, the flanges 11 and 12 each have a rectangular aperture cut from the center thereof, which aperture 13 is of a size to fit snugly around the end of the spool body 10. The end flanges 11 and 12 may be fixed to the coil spool 10 in any manner; however, it is preferred that the apertures 13 will be of such a size as to make a force fit around the end of the coil spool.

The term "printed circuit material" is used herein to define a material having an electrical insulating back which is coated with an electric conducting material, such as copper, so that the area of the conducting surface or surfaces of the material which are not intended to conduct may be removed by some method such as abrasion, stamping, etching, etc. In this manner, only those areas of conducting material which are intended to form a circuit, or circuits are left. Thus, the printed circuit end flange 11 is a composite material having a base or supporting material 14 which has electrical insulating properties and an conducting material 15 coated thereon so that the outer surface of the printed circuit material flange 11 is conducting. In a like manner, the flange 12 on the opposite end of the coil spool 10 is a composite material having an electrical insulating material 16 as a backing or stiffener and an electrical conducting material 17 coated on the outer surface of the stiffener material 16.

Figure 2:
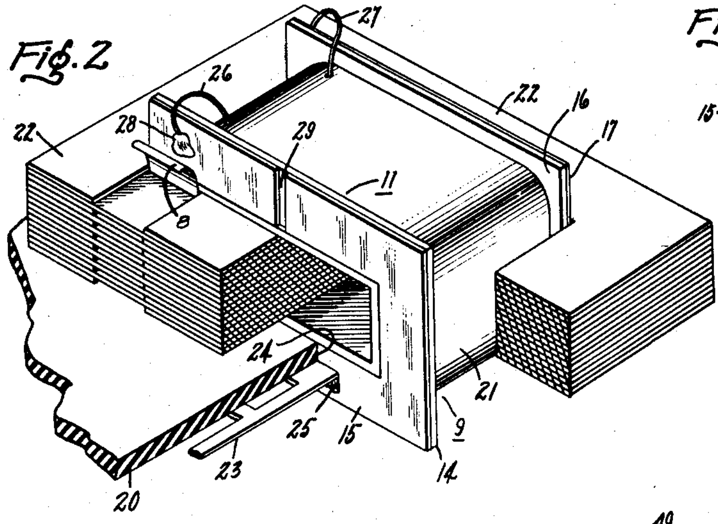
Fig. 2 is a partially broken away perspective view of a coil form of the type illustrated in Fig. 1 as applied to a printed circuit board and having a laminated iron core held therein.
Figures 3, 4:
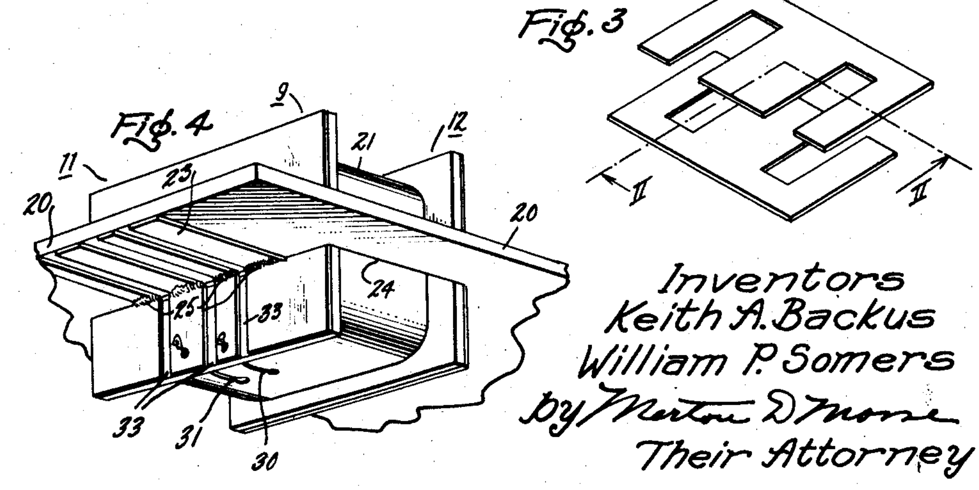
Fig. 3 is an exploded perspective view illustrating a pair of laminations of magnetic material similar to the ones utilized in the illustration of Fig. 2.
Fig. 4 is a perspective view of a coil form of the type illustrated in Fig. 1 applied to a printed circuit board and illustrates the use of a number of terminals on the coil form.

In Figs. 2 and 4, the coil form 9 illustrated in Fig. 1 is shown as utilized with a printed circuit board 20. In Fig. 2 the coil form 9 is utilized as a means to hold the coil 21 wound thereon to the printed circuit board, to provide electrical connections between the coil 21 and the electrical circuit on the board, and at the same time to secure a laminar magnetic core 22 thereto.

In the embodiment illustrated in Fig. 4, the coil form 9 is also utilized to secure the coil 21 wound thereon to the printed circuit board 20 and to provide electrical connections between the coil 21 and the board circuit. However, the magnetic core 22 is not utilized with the coil 21 in the embodiment of the invention illustrated in this figure.

The manner in which the coil form 9 is utilized to hold the coil 21 to the printed circuit board 20 may best be seen by reference to both Figs. 2 and 4. As illustrated in Fig. 2, the conducting surface of the printed circuit board 20 is etched away to leave only conductors 23 of the circuit on the lower surface of the board. In order to position the coil form 9 and its associated coil 21 on the printed circuit board 20, an aperture 24 is cut in the printed circuit board and the coil form 9 is positioned therein. The conductor 23 on the lower surface of the printed circuit board may then be soldered to the conducting surface 15 of the end flange 11 of the coil form 9 as indicated by the shaded area 25. It will be appreciated that such a soldering job may be performed between each end flange and a conductor on the lower surface of the printed circuit board and that the soldering job thus performed insures good electrical connections between the end flanges 11 and 12 of the coil form and the circuits on the circuit board 20. The soldering job thus performed also serves to hold the coil form 9 rigidly in place on the printed circuit board. This principle may be more clearly seen by reference to Fig. 4 which shows a perspective view of the lower surface of a printed circuit board.

Since the conducting surfaces of the end flanges 11 and 12 of the coil form 9 are electrically connected to the desired circuit on the lower surface of the printed circuit board, it will readily be seen how easily coil connections may be made to these circuits by simply bringing out leads, such as leads 26 and 27, from the coil 21 and soldering each lead as at 28, to the conducting surface of the opposite end flanges. These leads could also be brought through the end flanges as is illustrated with regard to the leads 30 and 31 in Fig. 4. In order to reduce eddy currents in the end flanges and still leave a current path between the end conductor 26 and the circuit 23 on the lower surface of the printed circuit board, a small portion of the conducting circuit of the end flange 11 is etched away at 29 to break the electrical conducting ring which would otherwise exist around the end flange 11.

Multiple taps may be brought out on the coil 21 by simply bringing out leads such as the leads 30 and 31 as illustrated in Fig. 4 passing them through holes in the end flange 11 and soldering them to a conducting portion thereof and then insulating the leads from each other by etching out portions 33 of the conducting surface on the end flange on each side of each of the leads 30 and 31. Each of the conducting portions on the end flange of the coil form 9 may then be soldered, as at 25 and as previously described, to a portion of the printed circuit 23 on the under side of the printed circuit board 20. As is obvious, the portions of the printed circuit on the under surface of the printed circuit board 20 to which the respective isolated conductors on the end flange 11 is soldered should also be electrically isolated from each other. An uninterrupted conducting surface may still be provided on the end flanges 11 and 12 between the portions which are above the circuit board 20 and those which are below the circuit board so that a connection may be made from a point above the printed circuit board to a circuit on the lower surface thereof.

Fig. 2 also illustrates a method of securing the laminar core 22 within the coil 21 without the use of rivets, bolts, or other such special holding devices. The type of laminations utilized in the core 22 illustrated in Fig. 2 are shown in detail in Fig. 3. As may be seen from Fig. 3, each lamination is flat and has the shape of an E. These laminations are all intended to be exactly alike. However, they are stacked with the arms of each succeeding E-shaped member facing in opposite directions. In other words, the laminations are intended to be placed so that alternate laminations are allochiral. Each lamination is preferably stacked with the center arm of the E protruding through the spool 10 of the coil form 9 with alternate laminations protruding through from opposite sides. The laminations are cut away in Fig. 2 as shown in the broken lines II—II of Fig. 3 so that the relative placement of the coil form, the laminations and the printed circuit board may be more clearly seen.

By the placement of the laminations as described, a closed magnetic circuit is provided around the entire coil and also through the opening in the spool 10 of the coil form. If the coil form is secured to the printed circuit board as previously described, the laminations may be stacked by inserting them in the coil form 10 in the manner previously described until the laminations form a tight fit between the upper surface of the spool 10 and the upper surface of the printed coil form board 20. In other words, the laminations may be stacked in the manner described until they are in compression between the upper inner surface of the coil spool 10 and the upper surface of the printed circuit board 20.

A more successful method of holding the laminations in the coil form is to stack the laminations in the spool 10 as previously described before securing the coil form to the printed circuit board 20, positioning the coil form in the aperture 24 of the printed circuit board 20, compressing the laminations by simply pressing the coil form into the aperture 24, and then soldering the end flanges of the coil form to the printed circuit on the lower surface of the board while the laminations are in compression. Thus when the solder hardens, the laminations are held in compression between the coil form 9 and the circuit board 20. In any case, an insulating material such as an insulating tape 8 should be inserted between the conducting portion of each end flange and the core 22 to electrically insulate the core from the end flanges and the entire assembly should be dipped in or sprayed with an insulating compound such as lacquer to help secure the laminations and provide insulation.

Figures 5, 6:
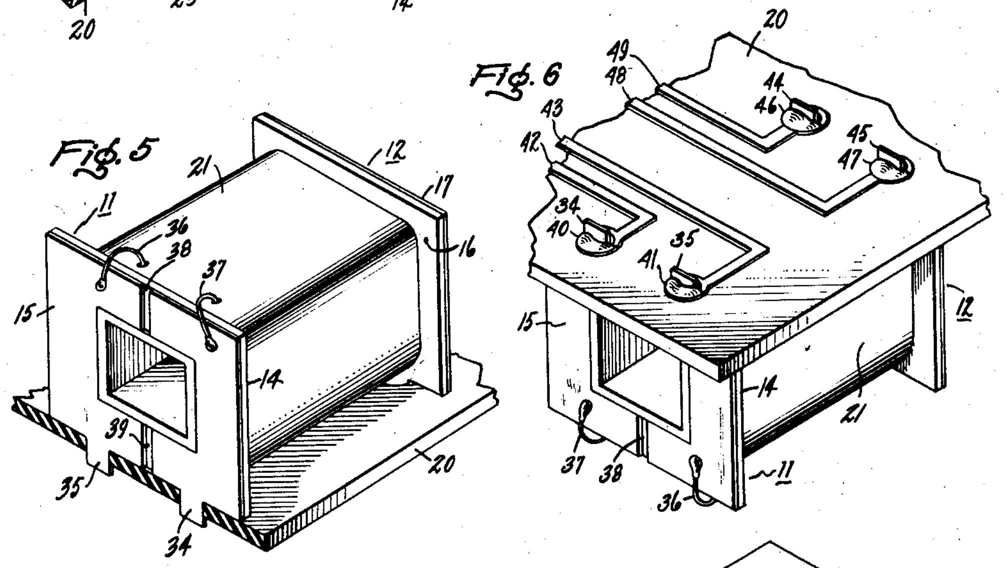
Fig. 5 is a perspective view illustrating a modification of the coil form of Fig. 1 and another embodiment of the subject invention.
Fig. 6 is a perspective view showing the lower side of a printed circuit board and the coil form illustrated in Fig. 5.

Another embodiment of this invention is illustrated in Figs. 5 and 6. Fig. 5 illustrates a coil form for use with printed circuits which is similar to the coil form 9 of Figs. 1, 2, and 4. For the purpose of simplicity, the components of Figs. 5 and 6 which correspond to similar components in Figs. 1, 2, and 4, are given like reference numerals.

The coil form of Fig. 5 consists of a spool body 10 and end flanges 11 and 12 as described with respect to the coil form of Fig. 1. The coil form of Fig. 5 differs from those previously described in that each of the end flanges 11 and 12 of the form 9 is provided with a pair of projections or tabs 34 and 35. These projections are provided for the purpose of providing a means to conduct current from above the printed circuit board 20 to the printed circuits on the lower surface of the board and for the purpose of securing the coil form 9 to the board. It will be appreciated that one tab may be provided or that more tabs can be provided depending upon the desired application.

As illustrated in Fig. 5, two leads 36 and 37 on the coil are connected to the end flange 11 on the coil form. In order to insulate the two leads from each other, a portion of the conducting surface 15 of the end flange is etched out between the two leads as at 28, and a portion is also etched out between the two tabs as at 39 so that the conducting surface on the end flange 11 is divided into two conducting parts each of which is electrically insulated from the other. As may best be seen from Fig. 6, the tabs on each end flange of the coil form may be projected through apertures in the printed circuit board and secured to the printed circuits on the lower surface thereof by simply soldering the conducting surface of the end flanges thereto. For example, the end tabs 34 and 35 respectively are each soldered as at 40 and 41 to leads 42 and 43 of the printed circuit, and the tabs 44 and 45 on the opposite end flange 12 are soldered as at 46 and 47 to the conductors 48 and 49 respectively.

It will be recognized that the objects of the invention have been achieved by providing a simple coil form wherein the leads from the coil may be connected directly to a conducting surface on a flange of the coil form, the coil form may be held in position on a chassis or printed circuit board by simply soldering a portion of the conducting surface of the flange to a circuit of printed circuit board or chassis, and a magnetic core may be secured in position within the coil form by the same connection which holds the coil in its position on the printed circuit board. It will be noted that all connections described herein are readily performed by present day dip solder techniques.

While particular embodiments of this invention have been shown, it will of course be understood that the invention is not limited thereto since many modifications in the instrumentalities employed may be made. It is contemplated that the appended claims will cover any such modifications as fall within the true spirit and scope of this invention.

What we claim as new and desire to secure by Letters Patent of the United States is:

1. The combination of a coil form having a laminated magnetic core member therein and a circuit board provided with at least one conductor thereon and at least one aperture therethrough, said coil form including a spool body and at least one flange on said spool body, said flange comprising a backing of electrical insulating material with a conducting surface thereon, the laminations of said laminated core member being positioned in such a manner that at least a portion of said laminations extend into said spool body, said coil form being positioned on said circuit board with a portion of said end flange extending through the aperture in said circuit board in such a manner as to hold said lamination between said coil and form and said board, said end flange and at least one conductor on said circuit board being mechanically and electrically connected whereby said coil form and said laminations are secured together and to said circuit board.

2. The combination of a coil form having a laminated magnetic core member therein and a circuit board having at least one conductor thereon and at least one aperture therethrough, said coil form including a spool body and a flange of printed circuit material on each end of said spool body, said flanges comprising a backing of electrical insulating material with a conduiting surface thereon, at least a portion of the laminations of said laminated core member being positioned in said spool body, said coil form and laminations being positioned on said circuit board with a portion of said end flanges extending through the aperture in said circuit board in such a manner that said laminations are held in compression between said coil form and said circuit board, at least one electrical and mechanical connection formed between each of said end flanges and a conductor on said circuit board whereby said coil form and laminations are fixed to said circuit board.

References Cited in the file of this patent

UNITED STATES PATENTS

| | | |
|---|---|---|
| 2,474,988 | Sargrove | July 5, 1949 |
| 2,502,291 | Taylor | Mar. 28, 1950 |
| 2,518,192 | Sharrow | Aug. 8, 1950 |
| 2,559,803 | Schneider | July 10, 1951 |
| 2,651,833 | Kernahan | Sept. 15, 1953 |